Figure 1:
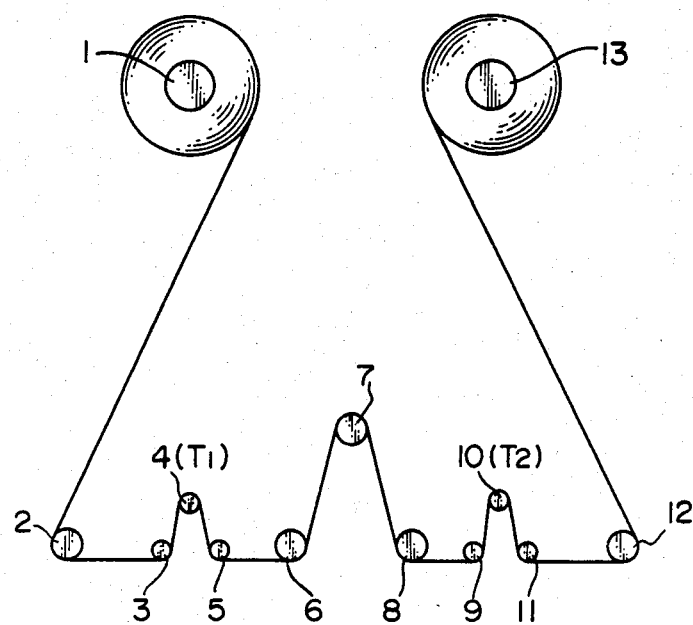

United States Patent [19]

Kiriyama et al.

[11] Patent Number: 4,539,389
[45] Date of Patent: Sep. 3, 1985

[54] BIAXIALLY ORIENTED POLYESTER FILM

[75] Inventors: Tsutomu Kiriyama; Shigeru Horie; Tetsuo Ichihashi; Masahiro Oshida, all of Matsuyama, Japan

[73] Assignee: Teijin Limited, Minamihonmachi, Japan

[21] Appl. No.: 593,237

[22] Filed: Mar. 26, 1984

[30] Foreign Application Priority Data

Mar. 30, 1983 [JP] Japan ................................ 58-52517
Mar. 30, 1983 [JP] Japan ................................ 58-52518

[51] Int. Cl.$^3$ ............................................. C08G 63/02
[52] U.S. Cl. .................................... 528/272; 525/437; 523/181
[58] Field of Search ..................... 525/437; 528/272; 523/181

[56] References Cited

U.S. PATENT DOCUMENTS 3,923,726 12/1975 Benz ..................................... 525/177
4,096,109 6/1978 Watanabe ............................. 523/181
4,138,386 2/1979 Motegi et al. ........................ 523/181

Primary Examiner—Lucille M. Phynes
Attorney, Agent, or Firm—Wenderoth, Lind & Ponack

[57] ABSTRACT

A biaxially oriented film of a film-forming aromatic polyester derived from an aromatic dicarboxylic acid as a main acid component and an aliphatic glycol as a main glycol component, said film having surface properties such that (1) it has a surface flatness, $R_{CLA}$, of from 0.001 to 0.016 micron,
(2) it has a coefficient of travelling friction, $\mu k$, of from 0.01 to 0.20, and
(3) the following relation is established between $R_{CLA}$ and $\mu k$, $$0.10 \leq 10 \times R_{CLA} + \mu k \leq 0.31.$$

Preferably, said film has many minute protrusions on its surface which are attributed to fine particles of titanium dioxide or of both titanium dioxide and calcium carbonate, and has such further surface property that (4) a distribution curve showing the relation between the heights of said many protrusions on the film surface and the numbers of the protrusions having the respective heights does not cross a straight line represented by the following equation (1)

$$\log_{10} y = -8.0x + 4.34 \tag{1}$$

where x and y are as defined above, within the range of $\log_{10} > 1$.

18 Claims, 2 Drawing Figures

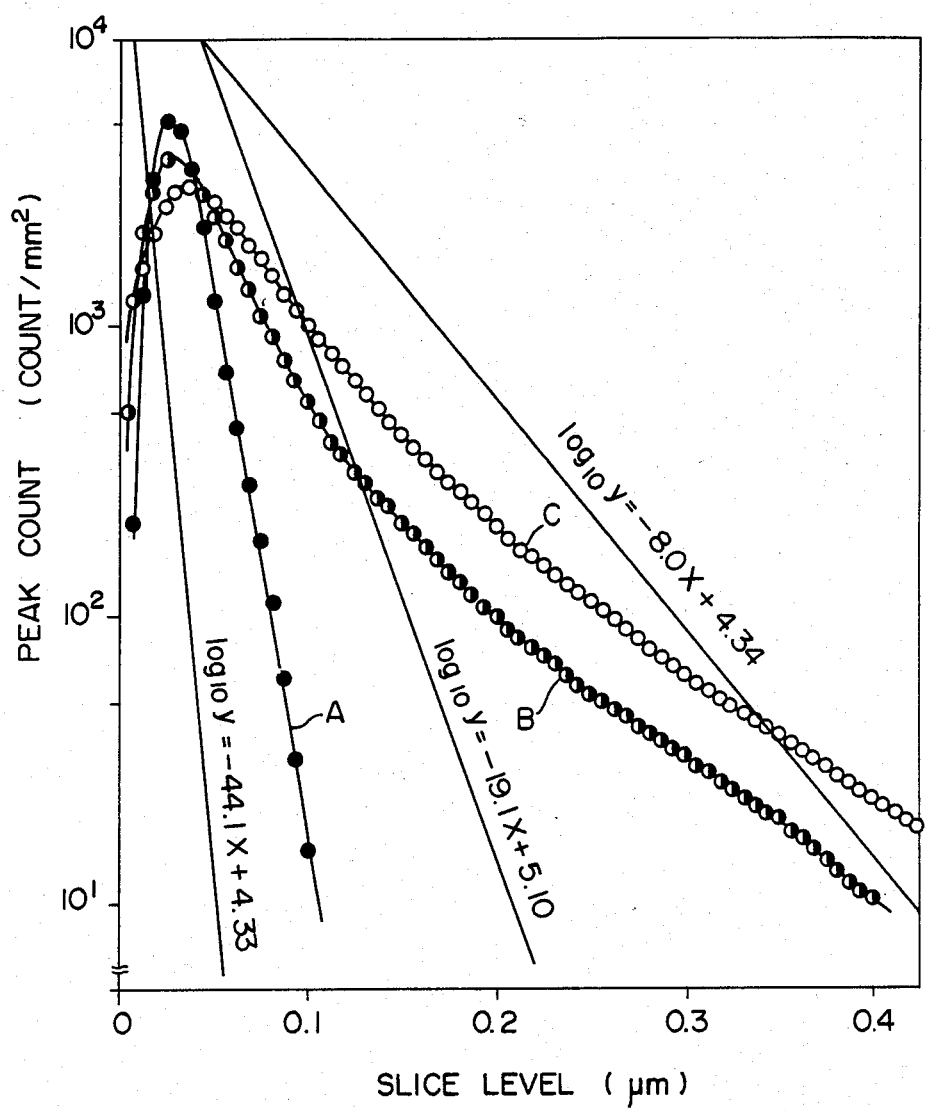

BIAXIALLY ORIENTED POLYESTER FILM

This invention relates to a biaxially oriented polyester film, and more specifically, to a biaxially oriented polyester film having excellent surface flatness and slipperiness and being suitable as a magnetic recording medium.

Polyester films now find extensive use in magnetic applications as video tapes, computer tapes, floppy discs and audio tapes, electrical applications as condensers, motor slot liners and electrical insulation tapes, packaging applications as laminated films and metal vapor-deposited films, and in various other applications as radiographic films, microfilms, graphic arts, design charts and stamping foils. Because of these wide applications, there has recently been a tremendous increase in the demand for polyester films.

On the other hand, the quality requirements of polyester films have become increasingly rigorous because of the need to make these products compact, increase the density of recording, upgrade their quality, etc.

In particular, for magnetic applications, very high levels of surface flatness and slipperiness are required. Since the surface flatness of a base film is reflected on a thin magnetic layer to be formed on it, the poor surface flatness of the base film affects the surface of the magnetic layer to not a small extent. Furthermore, when the magnetic film is wound up in a roll, the magnetic layer makes contact with the uncoated back surface of the base film. The poor surface flatness of the base film, therefore, leads to the tendency that the unevenness of the back surface of the base film is transferred to the magnetic layer. This phenomenon results in disturbing the recording of information by the magnetic layer.

To improve operability during the production of a base film, the film is required to have good windability and be free from winding creases. For the excellent handlability of magnetic tapes during use, the base film requires excellent travelling property, durability, etc. The slipperiness of the film very greatly affects such operability or handlability.

For improvement in the slipperiness of a film, the prior art discloses a method in which inorganic particles such as silicon oxide, titanium dioxide, calcium carbonate, talc, clay and calcined kaolin are added to a polyester used as a film substrate (see, for example, Japanese Laid-Open Patent Publication No. 57562/1979), and a method in which fine particles containing calcium, lithium or phosphorus are deposited within the polymerization system for producing a polyester (see, for example, Japanese Patent Publication No. 32914/77).

In film formation, the above fine particles insoluble in the polyester form protrusions on the film surface, and increase the slipperiness of the film. The method of improving the slipperiness of the film by providing protrusions of fine particles, however, gives rise to the essential problem that the protrusions, on the other hand, impair the flatness of the film surface. Attempts have been made to provide a compromise between flatness and slipperiness by utilizing a combination of fine particles having a relatively large particle size and fine particles having a relatively small particle size.

U.S. Pat. No. 3,821,156 discloses a combination of 0.02 to 0.1% by weight of calcium carbonate having an average particle size of 0.5 to 30 microns and 0.01 to 0.5% by weight of silica or hydrated aluminum silicate having an average particle size of 0.01 to 1.0 microns.

U.S. Pat. No. 3,884,870 discloses a combination of about 0.002 to about 0.018% by weight of fine inert particles, such as calcium carbonate, calcined aluminum silicate, hydrated aluminum silicate, magnesium silicate, calcium silicate, calcium phosphate, silica, alumina, barium sulfate, mica and diatomaceous earth, having a particle size of about 0.5 to about 30 microns and about 0.3 to about 2.5% by weight of fine inert particles, such as silica, calcium carbonate, calcined calcium silicate, hydrated calcium silicate, calcium phosphate, alumina, barium sulfate, magnesium, sulfate and diatomaceous earth, having a particle size of about 0.01 to about 1.0 micron.

U.S. Pat. No. 3,980,611 discloses that fine particles of calcium phosphate having three particle size grades of less than 1.0 micron, 1 to 2.5 microns and more than 2.5 microns are combined, and added to a polyester in a total amount of not more than 5,000 ppm.

Japanese Patent Publication No. 41,648/1980 (Laid-Open Patent Publication No. 71,154/1978) proposes a combination of 0.22 to 1.0% by weight of fine particles having a particle size of 1.2 to 2.5 microns and 0.003 to 0.25% by weight of fine particles having a particle size of 1.8 to 10 microns, the fine particles being those of an oxide or inorganic salt of an element of Groups II, III and IV of the periodic table.

Japanese Patent Publication No. 40,929/1980 (Laid-Open Patent Publication No. 11,908/1977) discloses a combination of 0.01 to 0.08% by weight of fine inert inorganic particles having a particle size of 3 to 6 microns and 0.08 to 0.3% by weight of fine inert inorganic particles having a particle size of 1 to 2.5 microns, the total amount of these fine particles having different particles sizes being 0.1 to 0.4% by weight and the ratio of the large size particles to the small size particles being from 0.1 to 0.7.

Japanese Laid-Open Patent Publication No. 78,953/1977 discloses a biaxially oriented polyester film containing 0.01 to 0.5% by weight of inert particles having a particle size of 10 to 1,000 microns and 0.11 to 0.5% by weight of calcium carbonate having a particle size of 0.5 to 15 microns. This patent document lists up various inorganic substances other than calcium carbonate as the inert particles having a particle size of 10 to 1,000 microns in its general description, but only discloses specific examples in which silica or clay normally available as fine particles having a particle size of 10 to 1,000 microns is used as an inorganic substance.

As stated above, with biaxially oriented polyester films (base films) obtained by the prior techniques discussed above, there is a tendency of one of their surface flatness and running slipperiness to be deteriorated as the other is improved. Investigations of the present inventors have shown that because of this tendency, the conventional biaxially oriented polyester films do not completely have an $R_{CLA}$ (a measure of the surface flatness of a film) and a coefficient of travelling friction, $\mu k$ (a measure of the slipperiness of the film during travelling), as defined hereinafter, which only meet at least one of the following expressions $10 \times R_{CLA} (\mu m) + \mu k > 0.31$, $\mu k > 0.20$, and $R_{CLA} > 0.016$.

In other words, the prior techniques intended to improve the surface flatness and slipperiness of a polyester film simultaneously by adding fine inert particles did not even teach the possibility of providing a polyester film having improved surface flatness and improved slipperiness by including fine inert particles.

It is an object of this invention to provide a biaxially oriented polyester film having excellent surface flatness and slipperiness.

Another object of this invention is to provide a biaxially oriented polyester film having excellent surface flatness and slipperiness and having formed on its surface minute protrusions attributed to fine particles of titanium dioxide or fine particles of both titaniunm dioxide and calcium carbonate.

Still another object of this invention is to provide a biaxially oriented polyester film which has an equivalent or higher slipperiness ($\mu$k) to or than a certain biaxially oriented polyester film known previously in the art and yet shows a much better surface flatness ($R_{CLA}$) than it.

Yet another object of this invention is to provide a biaxially oriented polyester film which has an equivalent or higher flatness to or than a certain biaxially oriented polyester film known previously in the art and yet shows a much higher slipperiness than it.

A further object of this invention is to contribute to the art on the basis of the unexpected discovery that a polyester containing specified fine particles having a relatively small particle size according to the state of the prior art but having a controlled particle size or particle size distribution unexpectedly possesses excellent film surface properties different from those of biaxially oriented polyester films known heretofore in the art.

An additional object of this invention is to provide a magnetic tape having excellent surface flatness and slipperiness as well as excellent magnetic recording characteristics.

Further objects and advantages of this invention will become apparent from the following description.

In accordance with this invention, these objects and advantages of this invention are achieved by a biaxially oriented film of a film-forming aromatic polyester derived from an aromatic dicarboxylic acid as a main acid component and an aliphatic glycol as a main glycol component, said film having surface properties such that (1) it has a surface flatness, $R_{CLA}$ defined by the following equation, of from 0.001 to 0.016 micron, $$R_{CLA} = \frac{1}{L} \int_O^L |f(x)|dx$$

wherein $R_{CLA}$ is the flatness of the film surface determined by the center line average method, f(x) is the sum of vertical distances from a straight line with a length L drawn across a film surface roughness curve measured by using a needle-contacting type surface roughness tester and being nearly parallel to the base line of said curve to maximum and minimum points of said curve respectively, and L is the length stated above for use in calculating f(x) in the surface roughness curve, (2) it has a coefficient of travelling friction, $\mu$k, defined by the following equation, of from 0.01 to 0.20, $$\mu k = \frac{2.303}{0.844\pi} \log \frac{T_2}{T_1}$$

wherein $T_2$ is the tension of the film which has been caused to travel on a fixed rod of SUS 304 stainless steel having an outside diameter of 5 mm, and $T_1$ is its tension before passage over the fixed rod, and (3) the following relation is established between $R_{CLA}$ and $\mu$k, $$0.10 \leq 10 \times R_{CLA} + \mu k \leq 0.31.$$

The biaxially oriented polyester film of this invention has excellent flatness defined by $R_{CLA}$ widely used in the art as measure of the flatness of a film surface. Since qualitatively the $R_{CLA}$ value may be said to represent an average value of the protruding heights of many protrusions on the film surface extending from the base surface of the film, the film of this invention having an $R_{CLA}$ value of 0.001 to 0.016 micron generally has many very minute protrusions.

Furthermore, owing to the presence of these very minute protrusions, the polyester film of this invention has excellent slipperiness represented by a coefficient of travelling friction, $\mu$k, used herein as a measure of the slipperiness of the film, of from 0.01 to 0.20.

As stated above, the excellent slipperiness of the polyester film of this invention is simultaneously achieved by the presence of the many very minute protrusions. Accordingly, the film of the invention also shows excellent resistance to abrasion by repeated travelling, and has the advantage of retaining its excellent slipperiness even when used over an extended period of time.

The aromatic polyester used in this invention is a polyester derived from an aromatic dicarboxylic acid or its derivative as a main acid component and an aliphatic glycol as a main glycol component. This polyester is substantially linear and has film formability, particularly film formability by melt-molding. Examples of the aromatic dicarboxylic acid include terephthalic acid, naphthalenedicarboxylic acid, isophthalic acid, diphenoxyethanedicarboxylic acid, diphenyldicarboxylic acid, diphenyletherdicarboxylic acid, diphenylsulfonedicarboxylic acid, diphenylketonedicarboxylic acid and anthracenedicarboxylic acid. Examples of the aliphatic glycol are polymethylene glycols having 2 to 10 carbon atoms such as ethylene glycol, trimethylene glycol, tetramethylene glycol, pentamethylene glycol, hexamethylene glycol and decamethylene glycol, and alicyclic diols such as cyclohexane dimethanol.

Preferred polyesters for use in this invention are those having an alkylene terephthalate and/or an alkylene naphthalate as a main constituent. Especially preferred are polyethylene terephthalate, polyethylene naphthalate, and copolymers in which at least 80 mole % of the entire dicarboxylic acid component consists of terephthalic acid and/or naphthalenedicarboxylic acid and at least 80 mole % of the entire glycol component consists of ethylene glycol. In this case, not more than 20 mole % of the entire acid component may consist of the other aromatic dicarboxylic acid mentioned above, an aliphatic dicarboxylic acid such as adipic acid or sebacic acid, or an alicyclic dicarboxylic acid such as cyclohexane-1,4-dicarboxylic acid. Furthermore, not more than 20 mole % of the entire glycol component may be the other glycol mentioned above, an aromatic diol such as hydroquinone, resorcinol and 2,2'-bis(4-hydroxyphenyl)propane, an aliphatic diol containing an aromatic such as 1,4-dihydroxymethylbenzene, or a polyalkylene glycol (polyoxyalkylene glycol) such as polyethylene glycol, polypropylene glycol or polytetramethylene glycol.

The aromatic polyester used in this invention may further include those which contain a component derived from a hydroxycarboxylic acid, for example an aromatic hydroxycarboxylic acid such as hydroxybenzoic acid or an aliphatic hydroxycarboxylic acid such as omegahydroxycaproic acid in an amount of up to 20 mole % based on the total amount of the dicarboxylic acid component and the hydroxycarboxylic acid component. Furthermore, the aromatic polyesters used in this invention may further contain copolymerized therewith a trifunctional or higher polycarboxylic acid or polyhydroxy compound such as trimellitic acid or pentaerythritol in an amount in which the polyesters remain substantially linear, for example in an amount of not more than 2 mole % based on the total amount of the acid component.

The aforesaid polyesters are known per se, and can be produced by methods known per se.

Preferably, the aromatic polyesters used in the invention have an intrinsic viscosity, determined at 35° C. for a solution in o-chlorophenol, of about 0.4 to about 0.9 dl/g.

The biaxially oriented polyester film of this invention has many minute protrusions on its surface as is clearly seen from the definition of $R_{CLA}$ defining the flatness of its surface. These many minute protrusions are attributed to many substantially inert solid fine particles dispersed in the aromatic polyester.

The aromatic polyester containing many inert solid fine particles can be produced usually by adding inert solid fine particles (preferably as a slurry in the glycol) to the reaction system during the reaction of forming the aromatic polyester, for example at any desired point of time during an interchange-esterification reaction by the interchange-esterification method or at any desired point of time during esterification reaction by the direct esterification method or during a polycondensation reaction. Preferably, the inert solid fine particles are added to the reaction system in the early stage of the interchange-esterification, the direct esterification, or the polycondensation reaction when the intrinsic viscosity of the polymer reaches about 0.3 dl/g, for example.

Preferably, the inert solid fine particles in this invention are particles of anatase-type titanium dioxide or a combination of anatase-type titanium dioxide and calcium carbonate. Anatase-type titanium dioxide and calcium carbonate having commercially available chemical compositions may be used. Anatase-type titanium dioxide containing small amounts of phosphorus and potassium atoms are especially preferred. Calcium carbonate may be precipitated calcium carbonate and heavy calcium carbonate.

The inert solid fine particles used in this invention have a characteristic particle size distribution defined by the following particle diameter ratio.

Fine particles of anatase-type titanium dioxide used in this invention have a particle size distribution ratio ($\gamma$), represented by the following equation, of from 1.2 to 2.3.

$$\gamma = \frac{D_{25}}{D_{75}}$$

In the above equation, $D_{25}$ is the particle diameter of the fine particles when their cumulative weight is 25% based on their total weight, and $D_{75}$ is the particle diameter of the fine particles when their cumulative weight is 75% based on their total weight, the cumulative weights being calculated beginning with the largest particle size.

The particle size distribution ratio is preferably in the range of from 1.3 to 2.2, more preferably in the range of from 1.4 to 2.1.

Fine particles of anatase-type titanium dioxide defined by this particle size distribution ratio usually cannot be obtained commercially, but can be prepared by treating commercially available products. For example, as will be described in detail in Examples to be given hereinafter, such fine particles of anatase-type titanium dioxide having the aforesaid particle size distribution ratio can be prepared by crushing or disintegrating commercial anatase-type titanium dioxide in a solvent such as ethylene glycol, subjecting the crushed or distintegrated particles of the titanium dioxide to a precipitation treatment to separate coarse particles, and subjectinge the fine particles to a filtration treatment, etc. When anatase-type titanium dioxide having a particle size distribution ratio of more than 2.3 is used, many high protrusions, which develop an interference fringe with three or more rings under T1 light, are formed on the three or more rings under T1 light, are formed on the surface of the resulting biaxially oriented film. This affects the magnetic layer of the film, too, and tends to markedly deteriorate its electromagnetic converting characteristics.

The anatase-type titanium dioxide particles used in this invention have an average particle diameter in the range of 0.1 to 0.5 micron, preferably 0.15 to 0.47 micron, more preferably from 0.17 to 0.45 micron, and do not substantially contain particles having a particle diameter of at least 4 microns.

The content ($W_S$) of the titanium dioxide particles in the film (polyester) is preferably 0.01 to 2.5% by weight, especially preferably 0.05 to 2.0% by weight, above all 0.07 to 1.8% by weight.

If the titanium dioxide particles have an average particle diameter of less than 0.10 micron and their content ($W_S$) in the film is less than 0.01% by weight, the resulting film has poor surface slipperiness, and frequently cannot be wound up during film formation.

The titanium dioxide particles used in this invention contains oxygenated phosphorus in an amount, as $P_2O_5$, of preferably 0.25 to 1.0% by weight, more preferably 0.28 to 1.0% by weight, and oxygenated potassium in an amount, as $K_2$, of preferably 0.1 to 0.30% by weight, more preferably 0.1 to 0.28% by weight.

The anatase-type titanium dioxide containing phosphorus and potassium atoms in the amounts shown above has a good color, exhibits excellent resistance to flocculation in a dispersing medium such as ethylene glycol, and has a low tendency to abrade. Accordingly, it has the advantage of supressing damages of a slitter blade or a rotary blade during film preparation, and thus brings about advantages in operability, equipment maintenance, the cost of production, etc.

The fine particles of calcium carbonate used in this invention has a particle size distribution ratio ($\gamma$), defined hereinabove, of 1.5 to 2.3, preferably from 1.5 to 2.2, more preferably from 1.5 to 2.1.

Fine particles of calcium carbonate defined by this particle size distribution ratio usually cannot be commercially obtained, but can be prepared by treating commercial products by the same methods as described above with regard to the method of treating commercial titanium dioxide.

The fine particles of calcium carbonate used in this invention have an average particle diameter in the range of 0.3 to 1.5 microns, preferably 0.4 to 1.4 microns, more preferably 0.5 to 1.3 microns, and do not substantially contain particles having a particle diameter of more than 4 microns.

The content ($W_B$) of the calcium carbonate particles in the film (polyester) is 0.01 to 0.3 part by weight, preferably 0.02 to 0.28% by weight, more preferably 0.03 to 0.25% by weight. If the average particle diameter of the calcium carbonate particles is larger than 1.5 microns and their content ($W_B$) in the film is larger than 0.3% by weight, the resulting polyester film has good slipperiness but the frequency of raised and depressed portions on the film surface increases. In a magnetic recording tape, this increased frequency tends to result in larger noises during magnetic recording. When the content of the calcium carbonate particles in the film is 0.1 to 0.3% by weight, the film surface tends to have increased roughness (represented by a larger $R_{CLA}$ value). On the other hand, when the amount of the calcium carbonate particles is at least 0.01% by weight but less than 0.1% by weight, particularly 0.01 to 0.08% by weight, the coefficient of travelling friction ($\mu k$) of the travelling surface of the film does not change upon repeated use. Accordingly, when the content of calcium carbonate is less than 0.1% by weight, stability can be obtained in the durability and sliding characteristics of the film upon repeated travelling.

In the biaxially oriented polyester film of this invention containing both the fine particles of anatase-type titanium dioxide and the fine particles of calcium carbonate, the amount of the fine particles of titanium dioxide is preferably 0.1 to 0.5% by weight, and the amount of the fine particles of clacium carbonate is preferably 0.1 to 0.3% by weight, both based on the weight of the polyester. Furthermore, the titanium dioxide particles preferably have a smaller particle diameter than the calcium carbonate particles.

As stated above, the biaxially oriented polyester film of this invention is characterized by the fact that it has an $R_{CLA}$, a measure of the flatness of the film surface, of 0.001 to 0.016 micron, and a coefficient of travelling friction, $\mu k$, a measure of the slipperiness of the film during travelling, of 0.01 to 0.20, and the following relation is estibilized between $R_{CLA}$ and $\mu k$, $$0.10 \leq 10 \times R_{CLA} + \mu k \leq 0.31.$$

Base films for magnetic recording find a variety of applications. For example, in computer applications, base films having an $R_{CLA}$ of more than 0.03 micron and a $\mu k$ of less than 0.20 are used. In audio applications, films having an $R_{CLA}$ of more than 0.016 micron but less than 0.04 micron and a $\mu k$ of more than 0.05 but less than 0.25 are known.

Moreover, in these films, the following relation is established between $R_{CLA}$ and $\mu k$.

$$10 \times (R_{CLA}) + \mu k > 0.31 \qquad \ldots (A)$$

On the other hand, in video applications, there are only known base films having an $R_{CLA}$ of more than 0.016 micron but less than 0.032 micron and a $\mu k$ of less than 0.25 and within the range represented by the above expression (A). Because the travelling friction ($\mu k$) increases if the surface of the film is rendered flat by reducing its surface roughness ($R_{CLA}$), it has been very difficult and almost impossible to operate outside the above empirical formula (A).

Preferably, in the biaxially oriented polyester film of this invention, the following relation is established between $R_{CLA}$ and $\mu k$.

$$0.17 \leq 10 \times (R_{CLA}) + \mu k \leq 0.31$$

This film has such excellent durability that the coefficients of travelling friction of its travelling surface, measured repeatedly, do not so much vary.

Desirably, large protrusions should not exist on the surface of the film.

The biaxially oriented polyester film of this invention is characterized by the fact that the number ($>H_4$) of protrusions which develop an interference fringe with at least four rings under T1 light on the film surface is not more than 10/100 cm$^2$, and the number ($>H_3$) of protrusions which develop an interference fringe with at least three rings under T1 light is not more than 20/100 cm$^2$. The interference fringes can be observed by using a multiple interference reflection-type microscope in the method of measuring the number of surface protrusions to be described hereinafter.

Preferably, on the surface of the film of this invention containing both the titanium dioxide fine particles and calcium carbonate fine particles, at least 20% of protrusions having a heigth of at least 0.05 micron are derived from anatase-type titanium dioxide, and at least 0.3% of them are derived from calcium carbonate.

The polyester film of the present invention can be prepared, for example, by stretching an unstretched polyester film having an intrinsic viscosity of 0.35 to 1.0 dl/g obtained by melt extrusion and containing the inert solid particles at a temperature between the melting point (Tm) and Tm+70° C. in the longitudinal or transverse direction at a temperature between the second order transition point (Tg) of the polyester and Tg+70° C. at a stretch ratio of 2.5 to 5.0, and subsequently in a direction at right angles to the first stretching direction (when the first stretching direction is longitudinal, the second is transverse) at a temperature between Tg and Tg+70° C. and a stretch ratio of 2.5 to 5.0. The area stretch ratio is preferably between 12 and 22. The stretching process may be simultaneous biaxial stretching or successive biaxial stretching.

Then, the biaxially oriented film is set by heating it at a temperature between Tg+70° C. and Tm, for example between 190° and 230° C. for polyethylene terephthalate, for 1 to 100 seconds.

The thickness of the film is 3 to 100 microns, preferably 4 to 50 microns, especially preferably 8 to 25 microns.

In a preferred embodiment of this invention, the biaxially oriented polyester film has many protrusions on its surface in a distribution controlled in height and number. The controlled distribution can be determined by plotting the number of protrusions having a certain height against the height. The biaxially oriented polyester film of this invention having protrusions in the controlled distribution is such that its distribution curve obtained by plotting the heights of protrusions on its surface on the x axis and the numbers of protrusions having the respective heights on the y axis of a logarithmic scale does not cross a straight line represented by the following equation (1)

$$\log_{10} y = -8.0x + 4.34 \quad (1)$$

where x is the height in microns of protrusions on the film surface, and y is the number of protrusions having the height x per mm$^2$, within the range of $\log_{10} y > 1$.

When the protrusions on the film surface are derived only from titanium dioxide, the distribution curve should not cross a straight line represented by the following equation (2)

$$\log_{10} y = -19.1x + 5.10$$

wherein x and y are as defined for equation (1) above, within the range of $\log_{10} y > 1$.

Preferably, the maximum value of the distribution curve exists within the range represented by the following expression (3)

$$\log_{10} y < -19.1x + 5.10 \quad (3)$$

where y and x are as defined above.

Above all, the maximum value of the distribution curve is within the range which satisfies both equation (3) above and equation (4) below $$\log_{10} y > -44.1x + 4.33$$

wherein x and y are as defined for equation (1).

Thus, according to this invention, there is provided a biaxially oriented film of a film-forming aromatic polyester derived from an aromatic dicarboxylic acid as a main acid component and an aliphatic glycol as a main glycol component, said film having many fine protrusions on its surface which are attributed to fine particles of titanium dioxide or of both titanium dioxide and calcium carbonate, and said film having such surface properties that (1) it has a surface flatness $R_{CLA}$ of from 0.001 to 0.016 micron, (2) it has a coefficient of travelling friction, $\mu k$, of from 0.01 to 0.20, (3) the following relation is established between $R_{CLA}$ and $\mu k$, $$0.10 \leq 10 \times R_{CLA} + \mu k \leq 0.31, \text{ and}$$

(4) a distribution curve showing the relation between the heights of said many protrusions on the film surface and the numbers of the protrusions having the respective heights does not cross a straight line represented by the following equation (1)

$$\log_{10} y = -8.0x + 4.34 \quad (1)$$

where x and y are as defined above, within the range of $\log_{10} > 1$.

As stated above, the biaxially oriented polyester film of this invention has no large raised and depressed portions on its surface and is substantially flat and smooth. But it has such minute raised and depressed portions as not to disturb its electromagnetic converting characteristics when formed into a magnetic tape. The film of this invention has a low coefficient of friction during travelling, and its operability is very good. As a base film of a magnetic tape it has good durability and its shaving is very little when in frictional contact with the travelling portions of magnetic recording and playback devices.

Furthermore, during film formation, the biaxially oriented polyester film of this invention has good windability, and winding creases scarcely occur. In addition, it can be cut sharp with dimensional stability in a slitting operation.

Because of the aforesaid advantages of the film of this invention both as a film product and during film formation, the biaxially oriented polyester film of this invention is very useful in magnetic applications. It can be produced easily and stably. The film of this invention is particularly suitable as a base film of high grade magnetic recording media such as micro-recording materials, floppy discs, ultrathin high-density magnetic recording films for long-hour recording in audio and video applications, and magnetic recording films for recording and playback of high-quality images.

Accordingly, this invention also provides a magnetic recording medium comprising the biaxially oriented polyester film of this invention and a magnetic layer formed on one or both surfaces thereof.

Magnetic layers and methods for providing them on base films are well known, and can also be used in this invention.

For example, when a magnetic layer is formed on the base film by coating a magnetic paint, there can be used a ferromagnetic powder such as $\gamma\text{-Fe}_2\text{O}_3$, Co-containing $\gamma\text{-Fe}_2\text{O}_3$, $\text{Fe}_3\text{O}_4$, Co-containing $\text{Fe}_3\text{O}_4$, $\text{CrO}_2$, and barium ferrite in the magnetic paint. Known thermoplastic resins, thermosetting resins, reactive resins or mixtures of these may be used as a binder together with such a magnetic powder. Specific examples of such resins are a vinyl chloride/vinyl acetate copolymer and a polyurethan elastomer.

The magnetic paint may further include a polishing agent such as $\alpha\text{-Al}_2\text{O}_3$, a conductivity imparting agent such as carbon black, a dispersant such as lecithin, a lubricant such as n-butyl stearate or lecithinic acid, a curing agent such as an epoxy resin, and a solvent such as methyl ethyl ketone, methyl isobutyl ketone and toluene.

When the magnetic layer is to be formed by depositing a thin metal film on the base film, there can, for example, be used a vacuum deposition method, a sputtering method, an ion plating method, a chemical vapor deposition method (CVD), and an electroless plating method. Useful metals include, for example, iron, cobalt, nickel and their alloys such as Co-Ni-P alloy, Co-Ni-Fe alloy, Co-Cr alloy or Co-Ni alloy.

The various properties referred to in this invention are defined and measured as described below.

(1) Average particle diameter (DP) of inert inorganic particles

The particle diameter is measured by using a centrifugal particle size analyzer (Model CP-50 manufactured by Shimadzu Seisakusho K.K.). On the basis of the resulting centrifugal sedimentation curve, a cumulative curve of the particle diameters of the individual particles and their amounts is drawn. The particle diameter corresponding to 50 mass percent is read, and defined as the average particle diameter. (See Japanese-language book "Technique of Particle Size Measurement", pages 242-247, 1975, published by Nikkan Kogyo Press.)

(2) Particle size distribution ratio (γ) of inert inorganic particles

On the basis of the centrifugal sedimentation curve obtained in the measurement of the average diameter of inert inorganic particles in section (1) above, a cumulative curve of the particle diameters of the individual particles and their amounts is drawn. The particle diameter ($D_{25}$) at which the cumulative weight of the particles calculated beginning with the largest particle size corresponds to 25 mass percent and the particle diameter ($D_{75}$) at which the cumulative weight of the particles calculated beginning with the largest particle size corresponds to 75 mass percent are read from the cumulative curve. The $D_{25}$ value is divided by the $D_{75}$ value, and defined as the particle size distribution ratio (γ) of the inert inorganic particles.

(3) Coefficient of travelling friction (μk) of the film

Measured in the following manner by using a device shown in FIG. 1. In FIG. 1, the reference numeral 1 represents a pay-off reel; 2, a tension controller; 3, 5, 6, 8, 9 and 11, a free roller; 4, a tension detector (inlet); 7, stainless steel (SUS 304) fixed rod (outside diameter 5 mm); 10, a tension detector (outlet); 12, a guide roller; and 13, a take-up reel.

A film cut to a width of 0.5 inch in an environment kept at a temperature of 20° C. and a humidity of 60% is brought into contact with the solid rod (surface roughness 0.3 micron) at an angle $\theta = 152/180 = $ radian (152°) and moved in frictional contact therewith at a speed of 200 cm/min. The tension $T_1$ at the inlet is adjusted to 35 g by the tension controller 2, and the outlet tension ($T_2$ in grams) is detected by the outlet tension detector 10 after the film has travelled 90 meters. The coefficient of travelling friction, μk, is calculated in accordance with the following equation.

$$\mu k = \frac{2.303}{\theta} \log \frac{T_2}{T_1} = 0.868 \log \frac{T_2}{35}$$

(4) Flatness of the film surface

Measured by the CLA (center line average) method in accordance with JIS B-0601. By using a needle-contacting surface roughness tester (SURFCOM 3B made by Tokyo Seimitsu Co., Ltd.), a chart (film surface roughness curve) is drawn under a load of 0.07 g with a needle radius of 2 microns. A portion having a measured length L is picked up from the film surface roughness curve in the direction of its center line. The center line of this portion is assumed to be X axis and the direction of the longitudinal multiuplication, Y axis, and the roughness curve is expressed as Y=f(x). The value given by the following equation ($R_{CLA}$ in microns) is defined as the flatness of the film surface.

$$R_{CLA} = \frac{1}{L} \int_O^L |f(x)| dx$$

In this invention, the standard length is set at 0.25 mm, and the measurement is made through 8 replicates. The three largest measured values are excluded, and an average of the remaining five measured values is calculated and defined as $R_{CLA}$.

(5) Number of protrusions on the film surface

Aluminum is uniformly vacuum-deposited on the film surface to a thickness of 400 to 500 Å or smaller. Collodion is applied to the opposite uncoated film surface, and dried. Any 100 cm² area of the aluminum-deposited surface is observed through a Tl monochromatic light multiple interference reflection-type microscope (for example, one made by Carl Zeiss JENA) at a magnification of 100×. The number of protrusions having an inteference fringe with 3 or 4 or more rings generated corresponding to the projecting heights of the protrusions in the visual field of the microscope is counted. The number of protrusions having an interference fringe with 3 rings is represented by $H_3$, and the number of protrusions having an interference fringe with 4 rings, by $H_4$.

(6) abrasion

The film is caused to travel 90 meters by using the same measuring device and under the same conditions as used in the measurement of the coefficient of travelling friction in (3). The degree of adhesion of white powder to the fixed rod is visually observed and evaluated on a scale of the following five grades.

⊚ : No white powder occurs.
O: A small amount of white powder exists in an area less than one-fifth of the contacting portion of the fixed rod.
Δ: White powder exists in an area at least one-fifth but less than one-half of the contacting portion of the fixed rod.
X: White powder exists in an area at least one-half of the contacting portion of the fixed rod.
XX: White powder adheres to almost all of the contacting portion of the fixed rod, and partly scatters around the fixed rod.

(7) Windability during film formation (a) Roll formation (wound state) (widthwise direction)

The center portion (300 mm wide) alone of a biaxially oriented film formed in a thickness of 15 to 20 microns is wound up for 30 minutes while both edge portions of the film are cut off at a point about 1.5 m downstream of the take-up unit. The highest raised portion and the deepest depressed portion are located at the end portions of the wound center portion of the film, and the difference between the height of the former and the depth of the latter is measured and rated as follows:

| Rating | Difference (mm) |
| --- | --- |
| A | less than 2 |
| B | less than 4 |
| C | less than 6 |
| D | at least 6 |

(b) High edge (wound state) (left and right circumferential directions)

In the same way as in (a) above, a biaxially oriented film is wound up for 30 minutes with a width of 300 mm. The diameter of the film roll is measured at 2 cm from the right and left ends, respectively, by means of calipers. The difference between the measured left and right diameters is calculated, and rated as follows:

| Rating | Difference (mm) |
|--------|-----------------|
| A | less than 2 |
| B | less than 4 |
| C | less than 6 mm |
| D | at least 6 |

(c) Winding creases (during travelling)

In the same way as in (a) above, a biaxially oriented film is wound up for 30 minutes with a width of 300 mm. The number of creases formed during the winding is counted and rated as follows:
A: No winding crease.
B: One small winding crease occurs.
C: One large winding crease occurs.
D: Two or more winding creases occur.

(d) Winding creases (after the lapse of 2 weeks)

Samples rated A and B in (c) above are stored for 2 weeks in an air-conditioned atmosphere kept at a humidity of 65% and a temperature of 20° C., and it is determined whether new winding creases occur during the storage period. The results are rated in the same way as in (c) above.

(8) Analysis of the composition of inert inorganic particles in the protrusions on the film surface Three samples are cut off from a biaxially oriented film having a thickness of 15 to 20 microns. A surface layer about 0.2 micron thick was etched away uniformly from the surface of each of the samples by an oxygen ion, for example, generated in a low temperature plasma state. The individual surface protrusions of the etched samples are subjected to section analysis for titanium and calcium elements by using an energy dispersion-type X-ray analyzer (Hitachi scanning electron microscope Model S 430, Hitachi KEVEX). Any 1 mm$^2$ portion of an enlarged SEM photograph of the sample is observed through a stereomicroscope at a magnification of 20×, and the number of protrusions derived from calcium and the number of protrusions derived from titanium are counted. The same procedure is taken on the three film samples mentioned above. An average of the ratios of the number of calcium-derived protrusions to the number of titanium-derived protrusions is calculated, and the composition of inert inorganic particles in the protrusions on the film surface is analyzed.

(9) Electromagnetic converting characteristic (chroma S/N) of a magnetic tape

A magnetic paint having the following composition is coated on the film of the invention by a gravure roll. The magnetic layer is smoothed by a doctor knife. While the magnetic paint is still wet, the magnetic layer is magnetically oriented in a customary manner. The coated film is then dired and cured in an oven. It is calendered to make the coated surface uniform. It is then slit to form a magnetic tape, 0.5 inch wide, having the magnetic layer with a thickness of about 5 microns.

| Composition of the magnetic paint | (parts by weight) |
|---|---|
| Co-containing iron oxide powder | 100 |
| Eslex A (vinyl chloride/vinyl acetate copolymer made by Sekisui Kagaku Kogyo K. K.) | 10 |
| Nippolan 2304 (poyurethan elastomer made by Nippon Polyurethan Co., Ltd.) | 10 |
| Coronate L (polyisocyanate made by Nippon Polyurethan Co., Ltd.) | 5 |
| Lecithin | 1 |
| Methyl ethyl ketone | 75 |
| Methyl isobutyl ketone | 75 |
| Toluene | 75 |
| Silicone resin (lubricant) | 0.15 |

The electromagnetic converting characteristic (chroma S/N) of the resulting magnetic tape is measured by the following method.

By using a home VTR a signal resulting from superimposition of a 100% chroma level signal on a 50% white level signal (a 100% white level signal has a peak-to-peak voltage of 0.714 volt) is recorded, and its playback signal is measured by a Shibasoku noisemeter (Model 925R).

The chroma S/N is defined in accordance with the Shibasoku's definition as follows:

$$\text{Chroma } S/N \text{ (dB)} = 20 \log \frac{ES(p\text{-}p)}{EN(rms)}$$

In the above equation, ES(p-p) is the peak-to-peak potential (p-p) of the playback signal of the white level signal.

ES(p-p)=0.714 V (p-p)

EN (rms) is the root-mean-square of the peak voltages of the playback signal of the chroma level signal.

EN(rms)=AM noise rms voltage (V)

(1) Three-dimensional surface roughness

By using a contact-needle method three-dimensional roughness tester (Model SE-3AK made by Kosaka Kenkyusho K.K.), a contact needle (2 μmR) was caused to travel with respect to a certain reference plane (X-Y surface) under a load of 0.03 g, and the surface heights (Z) from the reference plane at a pitch of 2 microns were inputted into a computer memory. This operation was repeated by moving the contact needle at intervals of 2 microns within the X-Y plane, and the heights (Z) of the raised and depressed portions with respect to the reference plane (X-Y plane) were measured. The resulting scanned data at 2 micron pitches were converted to digital signals and stored in the momory.

The data stored in the momory were called and cut at 0.00625 micron levels (the levels in the Z direction of a cut plane resulting from slicing the raised and depressed portions present on the X-Y plane in the Z direction). The number of peaks existing at every level was counted, and defined as the number of peaks per mm$^2$.

The following examples illustrate the present invention more specifically. All parts in these examples are by weight.

EXAMPLE 1

(1) Preparation of an ethylene glycol slurry of anatase-type titanium dioxide particles Thirty parts of anatase-type titanium dioxide particles were added to 70 parts of ethylene glycol with stirring, and the mixture was agitated at high speed by a homogenizer to form a slurry (A). The particle size distribution of titanium dioxide constituting the slurry (A) was measured by a centrifugal particle size analyzer. It was found to have an average particle diameter of 0.64 micron, and a particle size distribution ratio ($\gamma$) of 2.9.

The slurry (A) was then processed in a sand grinder to form a slurry (B). The particle size distribution of titanium dioxide particles in the slurry (B) was measured in the same way as above. It was found to have an average particle diameter of 0.45 micron and a particle size distribution ratio ($\gamma$) of 3.0.

The slurry (B) was further processed by a decanter classifier rotating at a high speed to remove coarse particles of titanium dioxide, and then filtered on a filter having a nominal opening size of 1 micron to form a slurry (C). The titanium dioxide in the slurry (C) was measured in the same way as above. It was found to have an average particle diameter of 0.43 micron and a particle size distribution ratio ($\gamma$) of 1.8.

(2) Preparation of a polymer

One hundred parts of dimethyl terephthalate and 70 parts of ethylene glycol were subjected to interchange-esterification (IE) in the presence of 0.015 mole % of manganese acetate and 0.010 mole % of sodium acetate based on dimethyl terephthalate at 150° to 250° C. while distilling off methanol formed. During the interchange-esterification, the ethylene glycol slurry (C) of titanium diioxide particles (concentration 10% by weight) was added.

After the interchange-esterification, trimethyl phosphate which had been heated under reflux in the presence of ethylene glycol was added in an amount of 0.015 mole (as trimethyl phosphate) based on dimethyl terephthalate. Antimony trioxide was added in an amount of 0.030 mole % based on dimethyl terephthalate. The mixture was subjected to polycondensation (PC). After the polycondensation reaction, the polymer was cooled with water and cut to form pellets of polyethylene terephthalate (PET) having titanium dioxide particles dispersed therein.

(3) Film formation

The polyethylene terephthalate pellets obtained in (2) above were dried at 180° C. for 4 hours, and extruded by an extruder at 280° to 300° C., and cast onto a drum while maintaining the resin temperature at 280° C. to form an unstretched film having a thickness of 140 mcirons. The unstretched film was stretched to 3.5 times at 90° C. in the longitudinal direction and then to 4.0 times at 100° C. in the transverse direction, and then heat-set at 210° C. for 10 seconds to form a biaxially stretched film. The film was then wound up in a roll at a speed of 50 m/min. The wound state (in the widthwise direction and left and right circumferential directions) and winding creases of the roll were examined and found to be satisfactory.

(4) Evaluation of the biaxially stretched film

The surface roughness ($R_{CLA}$), the number of protrusions, abrasion, etc. of the film were measured by the methods described hereinabove, and the results are shown in Table 1.

A magnetic tape was prepared by the method described in (9) above using the above film as a base. The coefficient of travelling friction ($\mu k$) of the running surface (free from the magnetic layer) of this magnetic tape was measured. Furthermore, its electromagnetic converting characteristic (chroma S/N) was measured by using a commercial home VTR. The results are shown in Table 1. The very good results obtained demonstrate that this film can be suitably used as a film for high density recording.

EXAMPLES 2 AND 3

In each run, a biaxially stretched polyester film was prepared in the same way as in Example 1 except that the particle diameter, particle size distribution and amount of the titanium dioxide particles were changed as shown in Table 1.

The various properties of the film were measured, and the results are shown in Table 1. The good results show that the film can be suitably used as a film for high grade magnetic recording media.

EXAMPLES 4 AND 5

In each run, a biaxially stretched polyester film was prepared in the same way as in Example 1 except that the particle diameter, particle size distribution and amount of the titanium dioxide particles and the stretching conditions during film formation were changed as shown in Table 1.

The resulting film had high quality as shown in Table 1.

The distribution curve of the surface protrusions of the film is shown in curve A of FIG. 2.

EXAMPLE 6

A biaxially stretched polyester film was prepared in the same way as in Example 1 except that instead of the polyester used in Example 1, a copolyester derived from terephthalic acid as an acid component and a glycol component composed of 90% by weight of ethylene glycol, 5% by weight of 1,4-butanediol and 5% by weight of 1,6-hexamethylene glycol was used, and the stretching conditions and the particle diameter and particle size distribution of the titanium dioxide particles were changed as shown in Table 1. The resulting film has a very flat surface and good windability.

EXAMPLE 7

A biaxially stretched polyester film was prepared in the same way as in Example 1 except that polyethylene-2,6-naphthalate (PEN) was used instead of the polyester used in Example 1, the titanium dioxide slurry was added during direct esterification (ED) for polymer formation, and the particle size of the titanium dioxide particles, the extrusion temperature and the stretching conditions were changed as shown in Table 1. The resulting film did not have entirely good windability, but could be used as a base of magnetic tapes.

EXAMPLE 8

A biaxially stretched film was prepared under the conditions shown in Table 1 in the same way as in Example 1 except that the ethylene glycol slurry of titanium dioxide particles was added when the intrinsic viscosity of polyethylene terephthalate was less than 0.2 dl/g during the polycondensation, and the film was stretched in three stages as shown in Table 1. The resulting film had high quality as shown in Table 1.

sions having an interference fringe with 3 or more rings existed on the surface of the film.

TABLE 1

| Item | Unit | Example 1 | Example 2 | Example 3 | Example 4 | Example 5 | Example 6 | Example 7 | Example 8 |
|---|---|---|---|---|---|---|---|---|---|
| TiO$_2$ | | | | | | | | | |
| Crystal form | — | Anatase | Anatase | Anatase | Anatase | Anatase | Anatase | Anatase | Anatase |
| Average particle diameter (DP) | μ | 0.4 | 0.3 | 0.1 | 0.3 | 0.3 | 0.3 | 0.1 | 0.1 |
| Particle size distribution ratio (γ) | — | 1.8 | 1.8 | 1.9 | 1.6 | 1.8 | 1.7 | 1.9 | 1.9 |
| Content (W$_S$) in the film | wt. % | 0.15 | 0.20 | 0.30 | 0.02 | 0.45 | 0.06 | 0.15 | 0.15 |
| P content | wt. % | 0.31 | 0.35 | 0.38 | 0.38 | 0.32 | 0.31 | 0.38 | 0.38 |
| K content | wt. % | 0.25 | 0.20 | 0.25 | 0.18 | 0.18 | 0.25 | 0.25 | 0.25 |
| Polymer | — | PET | PET | PET | PET | PET | copolymerized PET | PEN | PET |
| Time of adding inert inorganic particles | — | IE | IE | IE | IE | IE | IE | DE | PN |
| Film formation | | | | | | | | | |
| Extrusion temperature | °C. | 280–300 | 280–300 | 280–300 | 280–300 | 280–300 | 280–300 | 280–310 | 280–310 |
| Stretching temperature | °C. | 90 × 100 | 90 × 100 | 90 × 100 | 90 × 100 | 90 × 100 | 90 × 100 | 90 × 100 | 90 × 160 |
| Stretch ratio [M × T × (M)] (*) | — | 3.5 × 4.0 | 3.5 × 4.0 | 3.5 × 4.0 | 4.0 × 3.5 | 3.5 × 4.5 | 4.5 × 3.5 | 3.0 × 3.5 | 2.2 × 3.5 × (2.2) |
| Heat-treating temperature | °C. | 210 | 210 | 210 | 210 | 210 | 210 | 210 | 210 |
| Wound state | | | | | | | | | |
| Widthwise direction | — | A | A | B | B | A | B | B | B |
| Left and right circumferential direction | — | A | A | A | A | A | A | A | A |
| Winding creases | | | | | | | | | |
| During travelling | — | A | A | A | A | A | A | B | A |
| 2 weeks later | — | A | A | A | A | A | A | B | B |
| Film surface | | | | | | | | | |
| Surface roughness (R$_{CLA}$) | μ | 0.010 | 0.011 | 0.006 | 0.006 | 0.012 | 0.007 | 0.007 | 0.007 |
| Coefficient of travelling friction (μk) | — | 0.15 | 0.14 | 0.16 | 0.12 | 0.09 | 0.10 | 0.17 | 0.17 |
| 10 (R$_{CLA}$) + (μk) | — | 0.26 | 0.25 | 0.22 | 0.18 | 0.21 | 0.17 | 0.24 | 0.24 |
| Number of protrusions | | | | | | | | | |
| >H$_3$ | per 100 cm$^2$ | 3 | 3 | 1 | 1 | 3 | 1 | 18 | 3 |
| >H$_4$ | per 100 cm$^2$ | 0 | 0 | 0 | 0 | 1 | 0 | 5 | 1 |
| Abrasion | — | ◉ | ◉ | ◉ | ◉ | ◉ | ◉ | ◉ | ◉ |
| Chroma S/N | | | | | | | | | |
| 1st time | dB | +0.2 | +0.3 | Standard (±0) | −0.2 | −0.7 | −0.5 | +0.1 | −0.2 |
| Drop after 100 passes | dB | 0.2 | 0.2 | 0.2 | 0.2 | 0.4 | 0.2 | 0.2 | 0.2 |
| Comprehensive evaluation | — | O | O | O | O | O | O | O | O |

(*): M = machine direction, T = transverse direction

COMPARATIVE EXAMPLE 1

An ethylene glycol slurry of anatase-type titanium dioxide particles (general-purpose grade) was prepared by a homogenizer.

The slurry was processed in a sand grinder, and then in a centrifugal separator to form a slurry in which the titanium dioxide particles had a particle size distribution ratio (γ) of 1.8.

Using the resulting titanium dioxide slurry, a biaxially stretched film was prepared under the conditons shown in Table 2 by the same method as in Example 1. The film did not have good surface properties. Microscopic observation showed that the film contained many flocculated titanium dioxide particles.

COMPARATIVE EXAMPLE 2

Commercial calcium carbonate particles having an average particle diameter of 3.0 microns were suspended in ethylene glycol by a homogenizer to form a slurry. Using the resulting slurry, a biaxially stretched film was prepared under the conditions shown in Table 2 in the same way as in Example 1. Many large protru-

COMPARATIVE EXAMPLE 3

A commercial silicon dioxide sol having an average particle diameter of as small as 0.1 micron was used, and a biaxially stretched film was prepared under the conditions shown in Table 2 by the same method as in Example 1. This film was difficult to wind up. The film surface was evaluated by selecting a sample free from winding creases. It was found that the number of large protrusions was small and the film surface was very flat. However, because of its poor windability, samples which permitted measurement of the coefficient of travelling friction and electromagnetic converting characteristics could not be obtained.

COMPARATIVE EXAMPLE 4

Commercial calcium carbonate particles having an average particle diameter of 0.8 micron were suspended in ethylene glycol by a homogenizer to form a slurry. Using the resulting slurry, a biaxially stretched film was prepared under the conditions shown in Table 2 in the same way as in Example 1. Many large protrusions having an interference fringe with 3 or more rings existed on the surface of the film.

The distribution curve of the surface protrusions of this film is as shown in curve C of FIG. 2.

0.92 micron and a particle size distribution ratio ($\gamma$) of 1.8.

(2) Preparation of a slurry of anatase-type titanium

TABLE 2

| Item | Unit | Comparative Example | | | |
|---|---|---|---|---|---|
| | | 1 | 2 | 3 | 4 |
| Inorganic particles | | | | | |
| Material | — | $TiO_2$ | $CaCO_3$ | $SiO_2$ | $CaCO_3$ |
| Average particle diameter (DP) | $\mu$ | 0.3 | 3.0 | 0.1 | 0.8 |
| Particle size distribution ratio ($\gamma$) | — | 1.8 | 2.7 | 2.2 | 2.5 |
| Content ($W_S$) in the film | wt. % | 0.3 | 0.03 | 0.4 | 0.3 |
| P content | wt. % | <0.25 | — | — | — |
| K content | wt. % | <0.1 | — | — | — |
| Polymer | — | PET | PET | PET | PET |
| Time of adding inert inorganic particles | — | IE | IE | IE | IE |
| Film formation | | | | | |
| Extrusion temperature | °C. | 280–300 | 280–300 | 280–300 | 280–300 |
| Stretching temperature | °C. | 90 × 100 | 90 × 100 | 90 × 100 | 90 × 100 |
| Stretch ratio M × T (*) | — | 3.5 × 4.0 | 3.5 × 4.0 | 3.5 × 4.0 | 3.5 × 4.0 |
| Heat-treating temperature | °C. | 210 | 210 | 210 | 210 |
| Wound state | | | | | |
| Widthwise direction | — | B | A | D | A |
| Left and right circumferential direction | — | A | A | D | B |
| Winding creases | | | | | |
| During travelling | — | B | A | D | A |
| 2 weeks later | — | A | A | — | A |
| Film surface | | | | | |
| Surface roughness ($R_{CLA}$) | $\mu$ | 0.011 | 0.024 | 0.006 | 0.020 |
| Coefficient of travelling friction ($\mu k$) | — | 0.22 | 0.12 | — | 0.14 |
| 10 ($R_{CLA}$) + ($\mu k$) | — | 0.33 | 0.36 | — | 0.34 |
| Number of protrusions | | | | | |
| >H₃ | per 100 cm² | 40 | 48 | 3 | 45 |
| >H₄ | per 100 cm² | 16 | 23 | 0 | 21 |
| Abrasion | — | Δ | Δ | — | Δ |
| Chroma S/N | | | | | |
| 1st time | dB | −2.0 | −2.5 | — | −2.3 |
| Drop after 100 passes | dB | 0.6 | 0.8 | — | 0.6 |
| Comprehensive evaluation | — | X | X | X | X |

(*): M = machine direction, T = transverse direction

EXAMPLE 9

(1) Preparation of a slurry of calcium carbonate particles in ethylene glycol

Thirty parts of commercial calcium carbonate particles were added to 70 parts of ethylene glycol with stirring, and the mixture was stirred at a high speed by a homogenizer to form a slurry (1) having a concentration of 30% by weight. The particle size distribution of calcium carbonate constituting the slurry (1) was measured by a centrifugal particle size analyzer. It was found to have an average particle diameter of 1.53 microns and a particle size distribution ratio ($\gamma$) of 2.9. The slurry (1) containing 30% by weight of calcium carbonate was processed in a sand grinder to form a slurry (2). The calcium carbonate particles in the slurry (2) were found to have an average particle diameter of 0.96 micron and a particle size distribution ratio ($\gamma$) of 3.1. The slurry (2) was treated by a decanter classifier rotating at a high speed to remove coarse particles of calcium carbonate. The remainder was filtered on a filter (commercial; nominal opening size 3 microns) to form a slurry (3). The calcium carbonate particles in the slurry (3) were found to have an average particle diameter of 0.92 micron and a particle size distribution ratio ($\gamma$) of 1.8.

(2) Preparation of a slurry of anatase-type titanium dioxide particles in ethylene glycol Commercial anatase-type titanium dioxide particles and ethylene glycol were mixed with stirring at a high speed in a homogenizer to prepare a slurry (1) having a concentration of 30% by weight. The slurry (1) was then treated in a sand grinder to form a slurry (2). The slurry (2) was treated in a decanter classifier rotating at a high speed, and then filtered to form a slurry (3). The particle size distributions of these slurries were measured, and the results are tabulated below.

| Slurry | Average particle diameter (DP, microns) | Particle size distribution ratio ($\gamma$) |
|---|---|---|
| (1) | 0.64 | 2.9 |
| (2) | 0.45 | 3.0 |
| (3) | 0.43 | 1.8 |

(3) Production of a polymer

One hundred parts of dimethyl terephthalate and 70 parts of ethylene glycol wre subjected to interchange-esterification in the presence of 0.015 mole % of manganese acetate and 0.010 mole % of sodium acetate both based on the amount of dimethyl terephtahlate at 150° to 250° C. while distilling off methanol. At this time, the ethylene glycol slurry (3) (concentration 10%) of calcium carbonate particles in ethylene glycol was added. After the interchange-esterification, trimethyl phosphate which had been heated under reflux in the presence of ethylene glycol was added in an amount of 0.015 mole % (as trimethyl phosphate) based on the amount of dimethyl terephthalate. Furthermore, 0.030 mole %, based on the amount of dimethyl terephthalate, of antimony trioxide was added, and the reaction mixture was subjected to polycondensation under a high vacuum of 1 torr or less. After cooling with water, the product was cut to form polyethylene terephthalate pellets having calcium carbonate particles dispersed therein.

On the other hand, polyethylene terephthalate pellets having titanium dixode particles dispersed therein were obtained in the same way as above by interchange-esterification and polycondensation except that the ethylene glycol slurry (3) of titanium dioxide particles prepared in (2) above was used instead of the calcium carbonate slurry.

(4) Film formation

The polyethylene terephthalate pellets having calcium carbonate particles dispersed therein were dry-blended with the polyethylene terephthalate pellets having titanium dioxide particles dispersed therein, and the mixture was dried at 180° C. for 4 hours. The mixture was then extruded through an extruder at 280° to 290° C., and cast onto a drum at a resin temperature of 290° C. to form an unstretched film having a thickness of 140 microns. The unstretched film was stretched at 90° C. to 3.5 times in the longitudinal direction and then to 4.0 times in the transverse direction, and then heat-set at 210° C. for 10 seconds to form a biaxially stretched polyester film. The film was wound up in roll form at a speed of 50 meters/min. The wound state (in the widthwise direction and the left and right circumferential directions) and the winding creases were examined and found to be satisfactory.

(5) Evaluation of the biaxially stretched film

The surface roughness ($R_{CLA}$), the number of surface protrusions, the abrasion, and other properties of the biaxially stretched film were measured by the methods described hereinabove. The results are shown in Table 3.

A magnetic layer was coated on the surface of the biaxially stretched polyester film by the method described in the measuring method (9) hereinabove to prepare a magnetic tape. The coefficient of travelling friction, $\mu k$, of the running surface (the surface free from the magnetic layer) of the magnetic tape was measured. Its electromagnetic converting characteristic of the magnetic tape was measured by using a commercial home VTR. The results were very good as shown in FIG. 3, and the above film can be used satisfactorily for high-density recording.

EXAMPLE 10

A biaxially stretched film was produced in the same way as in Example 1 except that the calcium carbonate particles and titanium dioxide particles were changed as shown in Table 3. The results shown in Table 3 demonstrate that the resulting film has such a high quality as can be suitably used as a base for high-grade magnetic recording media.

The distribution curve of the surface protrusions of this film is as shown in curve B of FIG. 2.

EXAMPLE 11

A biaxially stretched film was prepared under the conditions shown in Table 3 by the same method as in Example 9 except that titanium dioxide of a small particle size was used and a copolyester derived from terephthalic acid as an acid component and a glycol component composed of 90% by weight of ethylene glycol, 5% by weight of 1,4-butanediol and 5% by weight of propanediol was used as a material for film formation.

EXAMPLE 12

A biaxially stretched film was prepared under the conditions shown in Table 3 by the same method as in Example 9 except that an ethylene glycol slurry of calcium carbonate particles and titanium dioxide particles was added at the time of polycondensation of dimethyl terephthalate and ethylene glycol. The film had high quality as shown in Table 3.

EXAMPLES 13, 14 AND 15

Biaxially stretched polyester films were prepared under the varying film-forming conditions shown in Table 3. These films were found to be of high quality as shown in Table 3.

EXAMPLE 16

A biaxially stretched film was prepared under the conditions shown in Table 3 by the same method as in Example 9 except that polyethylene-2,6-naphthalate was used as a material for film formation, and a slurry of calcium carbonate and titanium dioxide was added during direct esterification for polymer formation. The resulting film had good quality as shown in Table 3.

TABLE 3

| Item | Unit | Example 9 | Example 10 | Example 11 | Example 12 | Example 13 | Example 14 | Example 15 | Example 16 |
|---|---|---|---|---|---|---|---|---|---|
| Inorganic particles | | | | | | | | | |
| $CaCO_3$ (large particles) | | | | | | | | | |
| Average particle diameter (DP) | $\mu$ | 0.9 | 0.8 | 0.4 | 0.5 | 0.7 | 0.8 | 1.2 | 0.8 |
| Particle size distribution ratio ($\gamma$) | — | 1.8 | 2.0 | 2.0 | 1.8 | 1.8 | 1.7 | 1.8 | 2.0 |
| Content ($W_S$) in the film | wt. % | 0.12 | 0.15 | 0.02 | 0.15 | 0.15 | 0.15 | 0.02 | 0.15 |
| $TiO_2$ (small particles) | | | | | | | | | |
| Crystal form | — | Anatase | Anatase | Anatase | Anatase | Anatase | Anatase | Anatase | Anatase |
| Average particle diameter (DP) | $\mu$ | 0.4 | 0.3 | 0.1 | 0.3 | 0.2 | 0.3 | 0.3 | 0.3 |
| Particle size distribution ratio ($\gamma$) | — | 1.8 | 1.8 | 1.9 | 1.8 | 2.0 | 1.8 | 2.1 | 1.6 |
| Content ($W_S$) in | wt. % | 0.15 | 0.20 | 0.30 | 0.20 | 0.30 | 0.20 | 0.30 | 0.20 |

TABLE 3-continued

| Item | Unit | Example 9 | Example 10 | Example 11 | Example 12 | Example 13 | Example 14 | Example 15 | Example 16 |
|---|---|---|---|---|---|---|---|---|---|
| the film | | | | | | | | | |
| P content | wt. % | 0.31 | 0.35 | 0.38 | 0.41 | 0.31 | 0.31 | 0.41 | 0.31 |
| K content ($W_S/W_B$) | wt. % | 0.25 | 0.20 | 0.25 | 0.18 | 0.25 | 0.25 | 0.20 | 0.18 |
| $TiO_2/CaCO_3$ content ratio in the film ($W_S/W_B$) | — | 1.25 | 1.33 | 15 | 1.33 | 2.0 | 1.33 | 15 | 1.33 |
| Average particle diameter ratio $CaCO_3/TiO_2$ ($DP_B/DP_S$) | — | 2.3 | 2.7 | 4 | 1.7 | 3.5 | 2.7 | 4 | 2.7 |
| Polymer | — | PET | PET | Copoly-merized PET | PET | PET | PET | PET | PEN |
| Time of adding inert inorganic particles | — | IE | IE | IE | PN | IE | IE | IE | DE |
| Film formation | | | | | | | | | |
| Extrusion temperature | °C. | 280–300 | 280–300 | 280–300 | 280–300 | 280–300 | 280–300 | 280–300 | 280–310 |
| Stretching temperature | °C. | 90 × 100 | 90 × 100 | 90 × 100 | 90 × 100 | 90 × 160 | 90 × 100 | 90 × 100 | 90 × 110 |
| Stretch ratio M × T × (M) (*) | — | 3.5 × 4.0 | 3.5 × 4.0 | 3.5 × 4.0 | 4.0 × 3.5 | 2.2 × 3.5 × (2.2) | 3.0 × 3.5 | 3.5 × 4.5 | 4.5 × 3.5 |
| Heat treating temperature | °C. | 210 | 210 | 210 | 210 | 210 | 210 | 210 | 210 |
| Wound state | | | | | | | | | |
| Widthwise direction | — | A | A | A | A | B | A | A | B |
| Left and right circumferential direction | — | A | A | A | A | A | A | A | A |
| Winding creases | | | | | | | | | |
| During travelling | — | A | A | A | A | A | A | A | B |
| 2 weeks later | — | A | A | A | A | B | A | A | B |
| Film surface | | | | | | | | | |
| Surface roughness ($R_{CLA}$) | μ | 0.011 | 0.012 | 0.007 | 0.011 | 0.011 | 0.012 | 0.013 | 0.014 |
| Coefficient of travelling friction (μk) | — | 0.15 | 0.14 | 0.09 | 0.15 | 0.15 | 0.13 | 0.13 | 0.15 |
| 10 ($R_{CLA}$) + (μk) | — | 0.26 | 0.26 | 0.16 | 0.26 | 0.26 | 0.25 | 0.26 | 0.29 |
| Number of protrusions | | | | | | | | | |
| >$H_3$ | per 100 cm² | 4 | 5 | 2 | 4 | 4 | 7 | 5 | 19 |
| >$H_4$ | per 100 cm² | 1 | 1 | 0 | 1 | 1 | 2 | 1 | 9 |
| Abrasion | — | ◎ | ◎ | ◎ | ◎ | ◎ | ◎ | ◎ | ◎ |
| Chroma S/N | | | | | | | | | |
| 1st time | dB | +0.3 | +0.5 | +0.2 | −0.2 | +0.2 | Standard (±0) | −0.5 | −0.7 |
| Drop after 100 passes | dB | 0.2 | 0.3 | 0.2 | 0.2 | 0.4 | 0.2 | 0.2 | 0.4 |
| Comprehensive evaluation | — | O | O | O | O | O | O | O | O |

(*): M = machine direction, T = transverse direction

COMPARATIVE EXAMPLE 5

Commercial calcium carbonate particles having an average particle diameter of 3.0 microns and commercial aluminum silicate hydrate particles of purified grade having an average particle diameter of 0.5 micron were used. Ethylene glycol slurries were prepared by using the same homogenizer as used in Example 9. The solid particles in these slurries were found to have a particle size distribution ratio (γ) of 2.7 and 2.6, respectively. A polyester was synthesized under the conditions shown in Table 4 substantially in accordance with Example 9 using these slurries. The resulting film was evaluated, and the results are shown in Table 4. There were as many as 56 protrusions developing an interference fringe with at least 3 rings under T1 light per 100 cm². The film was found to be unsuitable as a base of high-density recording media.

COMPARATIVE EXAMPLES 6 AND 7

In each run, a polymer was prepared by a method similar to that used in Comparative Example 5 using commercial calcium carbonate particles in a small amount and sol particles of silicon dioxide having an average particle diameter of less than 0.1 micron. The surface of the resulting film had large protrusions and its electromagnetic converting characteristic was not good, as shown in Table 4. The windability of the film was poor during film formation, and its handlability was poor. Furthermore, winding creases occurred, and a good sample was obtained only from a limited part of the film.

COMPARATIVE EXAMPLES 8 AND 9

A biaxially stretched film was prepared under the conditions shown in Table 4 using a combination of commercial kaolin particles having an average particle diameter of 2.0 microns and commercial silicon dioxide particles having an average particle diameter of 1.7 microns (Comparative Example 7) and a combination of commercial kaolin particles having an average particle diameter of 3.5 microns and commercial silicon dioxide particles having an average particle diameter of 2.0 microns (Comparative Example 8). The surface of the resulting film had many protrusions which developed an interference fringe with at least 3 rings under T1 light, and the film was useless as a base of high-density recording media.

TABLE 4

| Item | Unit | Comparative Example 5 | 6 | 7 | 8 | 9 |
|---|---|---|---|---|---|---|
| Inorganic particles | | | | | | |
| Large particles | | | | | | |
| Material | — | $CaCO_3$ | $CaCO_3$ | $CaCO_3$ | kaolin | kaolin |
| Average particle diameter ($DP_B$) | μ | 3.0 | 3.0 | 3.5 | 2.0 | 3.5 |
| Particle size distribution ratio (γ) | — | 2.7 | 2.8 | 2.8 | 2.7 | 2.9 |
| Content ($W_B$) in the film | wt. % | 0.03 | 0.02 | 0.005 | 0.01 | 0.04 |
| Small particles | | | | | | |
| Material | — | $Al_2O_3$, $SiO_2H_2O$ | $SiO_2$ | $SiO_2$ | $SiO_2$ | $SiO_2$ |
| Average particle diameter ($DP_S$) | μ | 0.56 | 0.05 | 0.02 | 1.7 | 2.0 |
| Particle size distribution ratio (γ) | — | 2.6 | 2.3 | 2.4 | 2.9 | 3.1 |
| Content ($W_S$) in the film | wt. % | 0.18 | 0.21 | 0.25 | 0.30 | 0.20 |
| Content ratio of small particles/large particles ($W_S/W_B$) | — | 6 | 10 | 50 | 30 | 5 |
| Average particle diameter ratio of large particles/small particles ($DP_S/DP_B$) | — | 6 | 60 | 175 | 1.2 | 1.8 |
| Polymer | — | PET | PET | PET | PET | PET |
| Time of adding inert inorganic particles | — | IE | IE | IE | IE | IE |
| Film formation | | | | | | |
| Extrusion temperature | °C. | 280–300 | 280–300 | 280–300 | 280–300 | 280–300 |
| Stretching temperature | °C. | 90 × 100 | 90 × 100 | 90 × 100 | 90 × 100 | 90 × 100 |
| Stretch ratio M × T (*) | — | 3.5 × 4.0 | 3.5 × 4.0 | 3.5 × 4.0 | 3.5 × 4.0 | 3.5 × 4.0 |
| Heat-treating temperature | °C. | 210 | 210 | 210 | 210 | 210 |
| Wound state | | | | | | |
| Widthwise direction | — | A | C | C | B | B |
| Left and right circumferential direction | — | A | C | C | A | A |
| Winding creases | | | | | | |
| During travelling | — | A | C | C | B | A |
| 2 weeks later | — | A | — | — | B | A |
| Film surface | | | | | | |
| Surface roughness ($R_{CLA}$) | μ | 0.025 | 0.011 | 0.009 | 0.041 | 0.045 |
| Coefficient of travelling friction (μk) | — | 0.15 | 0.21 | 0.22 | 0.09 | 0.08 |
| 10 ($R_{CLA}$) + (μk) | — | 0.40 | 0.32 | 0.31 | 0.50 | 0.53 |
| Number of protrusions | | | | | | |
| >$H_3$ | per 100 cm² | 56 | 37 | 23 | 33 | 87 |
| >$H_4$ | per 100 cm² | 20 | 16 | 12 | 15 | 36 |
| Abrasion | — | Δ | Δ | Δ | X | X |
| Chroma S/N | | | | | | |
| 1st time | dB | −2.5 | −2.3 | +1.8 | +1.0 | −3.5 |
| Drop after 100 passes | dB | 1.5 | 0.5 | 0.5 | 0.8 | 1.8 |
| Comprehensive evaluation | — | X | X | X | X | X |

(*): M = machine direction, T = transverse direction

What is claimed is:

1. A biaxially oriented film of a film-forming aromatic polyester derived from an aromatic dicarboxylic acid as a main acid component and an aliphatic glycol as a main glycol component, said film having surface properties such that (1) it has a surface flatness, $R_{CLA}$ defined by the following equation, of from 0.001 to 0.016 micron, $$R_{CLA} = \frac{1}{L} \int_0^L |f(x)|dx$$

wherein $R_{CLA}$ is the flatness of the film surface determined by the center line average method, f(x) is the sum of vertical distances from a straight line with a length L drawn across a film surface roughness curve measured by using a needle-contacting type surface roughness tester and being nearly parallel to the base line of said curve to maximum and minimum points of said curve respectively, and L is the length stated above for use in calculating f(x) in the surface roughness curve, (2) it has a coefficient of travelling friction, μk, defined by the following equation, of from 0.01 to 0.20, $$\mu k = \frac{2.303}{0.844\pi} \log \frac{T_2}{T_1}$$

wherein $T_2$ is the tension of the film which has been caused to travel on a fixed rod of SUS 304 stainless steel having an outside diameter of 5 mm, and $T_1$ is its tension before passage over the fixed rod, and (3) the following relation is established between $R_{CLA}$ and $\mu k$, $$0.10 \leq 10 \times R_{CLA} + \mu k \leq 0.31.$$

2. The film of claim 1 wherein the following relation is established between $R_{CLA}$ and $\mu k$, $$0.17 \leq 10 \times R_{CLA} + \mu k \leq 0.31.$$

3. The film of claim 1 or 2 which has a number of minute protrusions on its surface, said protrusions being attributed to fine particles of anatase-type titanium dioxide and calcium carbonate included in the polyester base.

4. The film of claim 3 wherein the fine particles of titanium dioxide have a particle size distribution ratio ($\gamma$), defined by the following equation, of from 1.2 to 2.3, $$\gamma = \frac{D_{25}}{D_{75}}$$

wherein $D_{25}$ is the particle diameter of the titanium dioxide particles when the cumulative weight of these particles is 25% based on their entire weight, and $D_{75}$ is the particle diameter of the titanium dioxide particles when the cumulative weight of these particles is 75% of the enier entire weight, the cumulative weights being calculated beginning with the largest particle size.

5. The film of claim 3 wherein the calcium carbonate particles have a particle size distribution ratio ($\gamma$) defined above of from 1.5 to 2.3.

6. The film of claim 3 or 4 wherein the titanium dioxide particles have an average particle diameter of 0.1 to 0.5 micron and do not substantially contain particles having a particle diameter of at least 4 microns.

7. The film of claim 6 wherein the titanium dioxide particles have an average particle diameter in the range of 0.15 to 0.47 micron.

8. The film of claim 3 or 5 wherein the calcium carbonate particles have an average particle diameter in the range of 0.3 to 1.5 microns and do not substantially contain particles having a particle diameter of at least 4 microns.

9. The film of claim 8 wherein the calcium carbonate particles have an average particle diameter in the range of 0.4 to 1.4 microns.

10. The film of any one of claims 3, 4, 6 and 7 wherein the amount of the titanium dioxide particles is 0.01 to 2.5% by weight based on the weight of the polyester.

11. The film of claim 10 wherein the amount of the titanium dioxide particles is 0.05 to 2.0% by weight based on the weight of the polyester.

12. The film of any one of claims 3, 5, 8 and 9 wherein the amount of the calcium carbonate particles is 0.01 to 0.3% by weight based on the weight of the polyester.

13. The film of claim 12 wherein the amount of the calcium carbonate particles is 0.02 to 0.28% by weight based on the weight of the polyester.

14. The film of claim 3 wherein the amount of the titanium dioxide particles is 0.1 to 0.5% by weight and the amount of the calcium carbonate particles is 0.1 to 0.3% by weight, both based on the weight of the polyester.

15. The film of claim 3 wherein the titanium dioxide particles contain 0.25 to 1.0% by weight, as $P_2O_5$, of oxygenated phosphorus, and 0.1 to 0.3% by weight, as $K_2O$, of oxygenated potassium.

16. A biaxially oriented film of a film-forming aromatic polyester derived from an aromatic dicarboxylic acid as a main acid component and an aliphatic glycol as a main glycol component, said film having many minute protrusions on its surface which are attributed to fine particles of titanium dioxide or of both titanium dioxide and calcium carbonate, and said film having such surface properties that (1) it has a surface flatness $R_{CLA}$ of from 0.001 to 0.016 micron, (2) it has a coefficient of travelling friction, $\mu k$, of from 0.01 to 0.20, (3) the following relation is established between $R_{CLA}$ and $\mu k$, $$0.10 \leq 10 \times R_{CLA} + \mu k \leq 0.31,$$

and (4) a distribution curve showing the relation between the heights of said many protrusions on the film surface and the numbers of the protrusions having the respective heights does not cross a straight line represented by the following equation (1)

$$\log_{10} y = -8.0x + 4.34 \tag{1}$$

where x and y are as defined above, within the range of $\log_{10} > 1$.

17. The film of claim 16 wherein the surface has such a protrusion distribution that a distribution curve representing the relation between the heights of the protrusions on the film surface and the number of protrusions at the individual heights does not cross a straight line represented by the following equation (2)

$$\log_{10} y = -19.1x + 5.10 \tag{2}$$

wherein x and y are as defined for equation (1) hereinabove, and the protrusions are attributed mainly to fine particles of titanium dioxide.

18. The film of claim 16 or 17 wherein the maximum value of the distribution curve is present within a range satisfying the following expression, $$\log_{10} y < -19.1x + 5.10 \tag{3}$$

wherein y and x are as defined for expression (1).

* * * * *